US012639050B2

(12) United States Patent
Shah et al.

(10) Patent No.: US 12,639,050 B2
(45) Date of Patent: May 26, 2026

(54) AI BASED FRONT-END USER INTERFACE DESIGN AND CODE GENERATOR

(71) Applicants: Bakhtiar Ali Shah, Saarbrücken (DE);
Leonard Knauss, Saarbrücken (DE);
Caroline Schmidt, Sarreguemines (FR);
Bao Tran, Saratoga, CA (US)

(72) Inventors: Bakhtiar Ali Shah, Saarbrücken (DE);
Leonard Knauss, Saarbrücken (DE);
Caroline Schmidt, Sarreguemines (FR);
Bao Tran, Saratoga, CA (US)

(73) Assignee: Native Pixel Inc., FL (US)

( * ) Notice: Subject to any disclaimer, the term of this patent is extended or adjusted under 35 U.S.C. 154(b) by 256 days.

(21) Appl. No.: 18/218,049

(22) Filed: Apr. 2, 2024

(65) Prior Publication Data

US 2025/0306868 A1 Oct. 2, 2025

(51) Int. Cl.
*G06F 8/38* (2018.01)
*G06F 8/34* (2018.01)
*G06F 8/35* (2018.01)

(52) U.S. Cl.
CPC .................. *G06F 8/38* (2013.01); *G06F 8/34* (2013.01); *G06F 8/35* (2013.01)

(58) Field of Classification Search
CPC .............................. G06F 8/38; G06F 8/34–35
USPC .............................. 717/106–140; 706/25–45
See application file for complete search history.

(56) References Cited

U.S. PATENT DOCUMENTS

| | | | | |
|---|---|---|---|---|
| 9,372,673 | B2 * | 6/2016 | Bertilsson | .................. G06F 8/35 |
| 9,443,192 | B1 * | 9/2016 | Cosic | ..................... G06N 3/006 |
| 10,331,423 | B1 * | 6/2019 | Parsolano | ................. G06F 8/20 |
| 11,074,044 | B1 * | 7/2021 | Schoppe | ................... G06F 8/38 |
| 11,221,833 | B1 * | 1/2022 | Huang | ..................... G06N 3/08 |
| 11,734,584 | B2 * | 8/2023 | A R | ......................... G06N 5/04 |
| | | | | 706/25 |
| 11,790,611 | B2 * | 10/2023 | Smet | ..................... G06T 19/006 |
| | | | | 345/633 |
| 11,816,459 | B2 | 11/2023 | Parsolano | |
| 11,893,365 | B2 * | 2/2024 | Naghshin | ................. G06F 8/38 |
| 11,983,365 | B1 * | 5/2024 | Ling | ................. G06F 3/03545 |
| 12,118,335 | B2 | 10/2024 | Parsolano | |
| 12,248,794 | B2 * | 3/2025 | Riva | ....................... G06N 3/045 |
| 12,430,103 | B1 * | 9/2025 | Domeniconi | ............. G06F 8/30 |
| 2018/0275971 | A1 | 9/2018 | Parsolano | |
| 2019/0250891 | A1 * | 8/2019 | Kumar | ...................... G06F 8/38 |
| 2022/0083316 | A1 | 3/2022 | Andersson | |

(Continued)

OTHER PUBLICATIONS

Dudley et al, "A Review of User Interface Design for Interactive Machine Learning", ACM, pp. 1-38 (Year: 2018).*

(Continued)

*Primary Examiner* — Anil Khatri

(74) *Attorney, Agent, or Firm* — PatentPC; Bao Tran

(57) ABSTRACT

A computer-implemented method is disclosed for generating and deploying user interface (UI) designs using AI. The method includes training a learning model on UI designs, receiving user parameters and constraints, and using the trained model to generate an initial UI design. The initial design is presented in a visual editor, where the user refines it into a finished UI, from which human-readable front-end code is produced. This code is sent to a receiving computing device that recreates on the receiving device substantially the same UI image as on the sending device.

18 Claims, 9 Drawing Sheets

(56) References Cited

U.S. PATENT DOCUMENTS

| | | |
|---|---|---|
| 2023/0112303 A1 | 4/2023 | Fader |
| 2023/0112710 A1 | 4/2023 | Huang |

OTHER PUBLICATIONS

Swearngin et al, "Modeling Mobile Interface Tappability Using Crowdsourcing and Deep Learning", ACM, pp. 1-12 (Year: 2019).*
Shen et al, "On Efficient Training of Large-Scale Deep Learning Models", ACM, pp. 1-37 (Year: 2024).*
Kodavalla, "Methodology for Determining Optimal Model and Training Data in Deep Learning", IEEE, pp. 1-6 (Year: 2022).*
Aggarwal et al, "Comparative Analysis of Machine Learning and Deep Learning Models for Land Use Classification: On UC Merced Dataset", IEEE, pp. 1-7 (Year: 2025).*

* cited by examiner

Figure 1A:
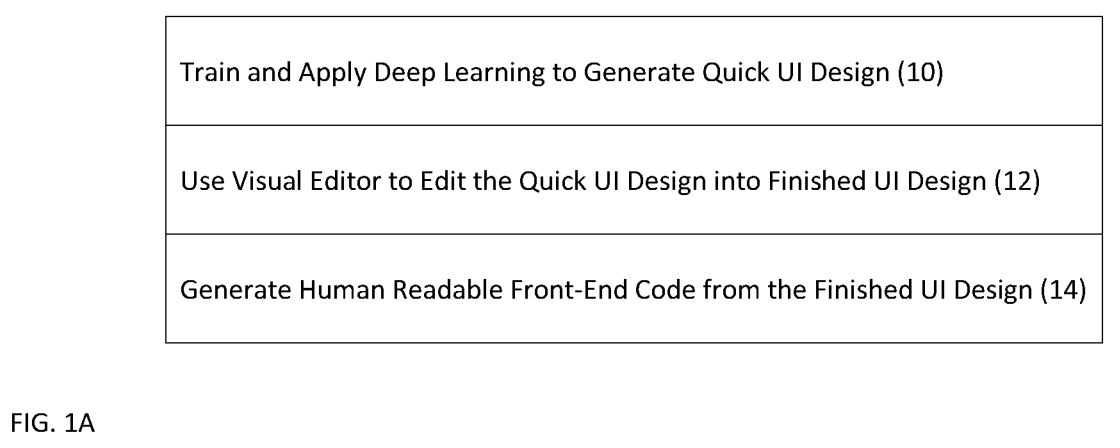

| |
|---|
| Train and Apply Deep Learning to Generate Quick UI Design (10) |
| Use Visual Editor to Edit the Quick UI Design into Finished UI Design (12) |
| Generate Human Readable Front-End Code from the Finished UI Design (14) |

Embodiment 210

AI BASED FRONT-END USER INTERFACE DESIGN AND CODE GENERATOR

BACKGROUND

The development of automated tools to assist in web and mobile application design has grown substantially in recent years. These tools are typically used to reduce the manual labor involved in creating user interfaces (UI) for web and mobile applications. Such tools provide a way for developers and designers to quickly create user-friendly UIs with little effort. One example of such a tool is a front-end editing and design platform Figma™.

Front-end design editors allow users to quickly generate a UI from scratch using pre-defined components and settings. They can be used to rapidly prototype and iterate on different designs. This process eliminates much of the manual labor associated with designing an interface from scratch. Furthermore, front-end designers can help ensure consistency across multiple devices by ensuring that all UI elements remain consistent in their look and feel. However, the code for each UI element still need to be generated, which can be expensive if done by humans. Some Figma™ plugins can generate the front-end code, but such systems rely on libraries and custom frameworks and as such are difficult for back-end coders to hook up to the front-end code.

SUMMARY

In one aspect, systems and methods for generating UI designs using deep learning and automated front-end code generation includes training a deep learning model on a dataset of existing UI designs; receiving user parameters and constraints for generating a quick UI design; generating a quick UI design using the trained deep learning model and user-provided parameters and constraints; providing a visual editor for the user to edit the quick UI design into a finished UI design; and generating human-readable front-end code from the finished UI design.

In another aspect, a method for design users, such as user interface designers ("UI designers"), web designers, and web developers is disclosed that allows user computing devices to render a corresponding user-interface (UI) design on a canvas, where the UI design under edit can be edited by design input and the network environment can be collaborative, such that multiple design users collaborate on a UI design at one time. The method providing a design interface that includes one or more tool panels and a canvas, the design interface enabling one or more design users to specify design input to create or modify a design under edit on the canvas. After the design is done, the method can create human readable code for each UI element ready for hook-up to backend code. The UI associated with an application source code can be abstracted into a view-controller object that conforms to an environment independent format. The characteristics can be a layout characteristic and a control element characteristic. A placeholder functionality for presenting the user interface can be embedded within an executable created from the source code. The placeholder functionality can lack the characteristic. The executable can be a target native runtime environment specific executable including programming instructions conforming to a programming language of the native runtime environment. The view-controller object can be converted to a language specific user interface object conforming to the programming language. The placeholder functionality can render the user interface using the UI object during runtime of the executable.

In another aspect, a system includes code to import design files (such as Figma™ design files), and code to create human readable code for each UI element ready for hook-up to backend code. The UI associated with an application source code can be abstracted into a view-controller object that conforms to an environment independent format. The characteristics can be a layout characteristic and a control element characteristic. A placeholder functionality for presenting the user interface can be embedded within an executable created from the source code. The placeholder functionality can lack the characteristic. The executable can be a target native runtime environment specific executable including programming instructions conforming to a programming language of the native runtime environment. The view-controller object can be converted to a language specific user interface object conforming to the programming language. The placeholder functionality can render the user interface using the UI object during runtime of the executable.

In a further aspect, a UI design method includes providing a design interface that includes one or more tool panels and a canvas, the design interface enabling one or more design users to specify design input to create or modify a design under edit on the canvas; enabling one or more users to interact with the design interface to (i) define a variant set, each variant of the variant set including a set of properties that defines a respective state of a run-time object; (ii) define one or more interactions for the variant set, each of the one or more interactions specifying a variant of the variant set that is to change to another variant of the variant set at run-time, in response to a particular trigger event; and (iii) create the user object as an instance of one of the variants of the variant set; create human readable code for each UI element ready for hook-up to backend code. The UI associated with an application source code can be abstracted into a view-controller object that conforms to an environment independent format. The characteristics can be a layout characteristic and a control element characteristic. A placeholder functionality for presenting the user interface can be embedded within an executable created from the source code. The placeholder functionality can lack the characteristic. The executable can be a target native runtime environment specific executable including programming instructions conforming to a programming language of the native runtime environment. The view-controller object can be converted to a language specific user interface object conforming to the programming language. The placeholder functionality can render the user interface using the UI object during runtime of the executable.

In one implementation, the method includes defining, based on design input, a variant component, the variant component including multiple variants that are logically linked as constituents of the variant component; wherein the variant component is associated with at least a state property that has multiple possible state property values, and each variant of the multiple variants is assigned to one of the multiple possible state property values; and providing a representation of the variant component on the one or more tool panels, the representation being manipulatable with design input to render each variant of the variant component on the canvas at the same time Advantages of the invention may include one or more of the following:

Automates the process of creating a UI from scratch, saving time and money.

Provides consistency across multiple devices, ensuring a uniform look and feel.

Generates human readable code for each UI element, making it easier to integrate with backend code.

Creates an abstracted view-controller object that is environment independent.

Embeds placeholder functionality within the executable to render the user interface during runtime.

Enables collaboration between multiple design users.

The system helps designers create responsive websites without writing a single line of code. The system provides Design-to-Code software, seamlessly integrating and automating web and app development, offers a superior and user-friendly experience. The robust design tool, empowers designers and programmers with unparalleled flexibility to create exactly what they want from scratch. It also offers a Figma™ import option, automatically converting ready-made projects into languages including but not limited to HTML, CSS, and JavaScript code within seconds. The system also utilizes ML (machine learning) algorithms to analyze the design and generate clean and optimized code, providing a faster and more efficient option. The system enables natural language programming, a technique that uses natural language descriptions to generate code for software applications. In this system, users write detailed descriptions of the app's function and the entities involved, which can then be translated into a viable running app.

Advantages of this approach is that it allows users to create software applications without having to learn programming languages or write code themselves. Instead, they can simply describe the app's function and the system generates the necessary code automatically. This can significantly reduce the barriers to entry for app development, making it accessible to a wider range of users. Another advantage of this approach is that it supports an iterative and/or incremental development process. Once an initial description has been written, users can add more detail to flesh it out further and refine the app's functionality. This can help ensure that the app meets the user's needs and requirements. In addition, this approach can make the app development process faster and more efficient. By using natural language descriptions to generate code, the system can automate many of the time-consuming tasks involved in app development, such as writing and debugging code. This can help reduce the time and resources required to develop software applications.

Overall, natural language programming has the potential to transform the way software applications are developed, making it easier and more accessible for non-programmers to create their own apps.

BRIEF DESCRIPTION OF THE DRAWINGS

FIG. 1A shows an exemplary process of AI assisted UI where the AI is used to generate a first draft UI and a graphics editing system is used to generate a final UI design and a code generator generates human readable front-end code for a new software.

DESCRIPTION

Figure 1B:
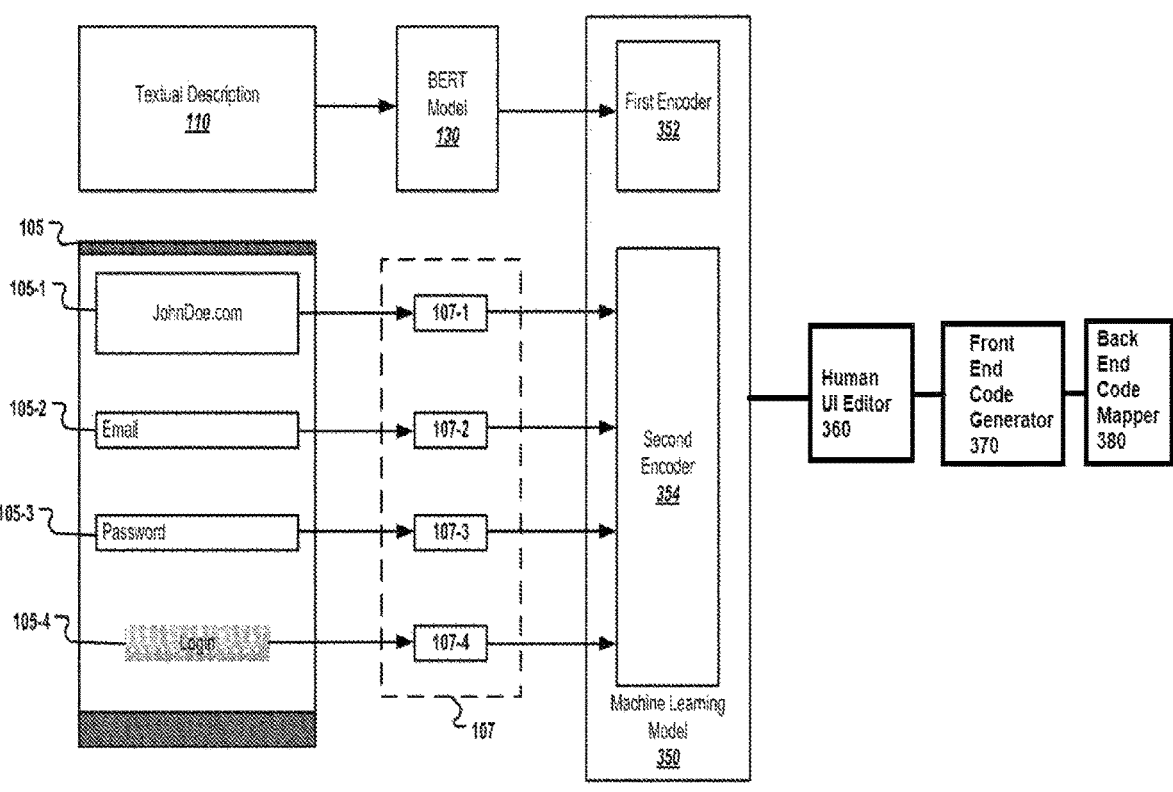
FIG. 1B illustrates an AI UI system operating with a graphic design system for a computing device of a user, and an automatic front-end code generator, according to one or more examples.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A shows an exemplary system that can train and apply deep learning to generate quick UI design, use visual editor to edit the quick UI design into finished UI design, and generate human-readable front-end code from the finished UI design. Here is an in-depth description of the system:

Training and Applying Deep Learning to Generate Quick UI Design: The system first involves training a deep learning model on a dataset of existing UI designs. This model can then generate quick UI designs based on a set of parameters and constraints provided by the user. The parameters could include things like the number of buttons, the color scheme, or the overall layout of the UI. The system uses the trained model to generate these quick UI designs quickly and efficiently.

Use Visual Editor to Edit the Quick UI Design into Finished UI Design: Once the quick UI design is generated, the user can then use a visual editor to make any necessary changes or modifications to the design. This visual editor is designed to be intuitive and user-friendly, allowing the user to quickly and easily make changes to the design without having to edit the underlying code directly.

Generate Human Readable Front-End Code from the Finished UI Design: Once the finished UI design is complete, the system can then generate human-readable front-end code from the design. This involves converting the visual elements of the design into code including but not limited to Vue, React, Angular, C #, HTML, CSS, and JavaScript code, among others, that can be used to create a functioning web application.

Integration with Development Workflow: The system is designed to integrate seamlessly with existing development workflows. The generated code can be easily imported into a project or integrated into a build tool or automation tool, allowing developers to quickly and easily create high-quality UI designs without having to spend hours writing code by hand.

Customizability: The system is highly customizable, allowing users to specify their own parameters and constraints when generating quick UI designs. This means that the system can be used to generate designs for a wide range of applications and use cases.

By using this system, designers and developers can quickly and efficiently generate UI designs and front-end code, freeing up time to focus on other aspects of the development process. The system's ability to generate human-readable code and integrate with existing development workflows makes it a powerful tool for creating high-quality web and desktop applications.

Figure 1C:
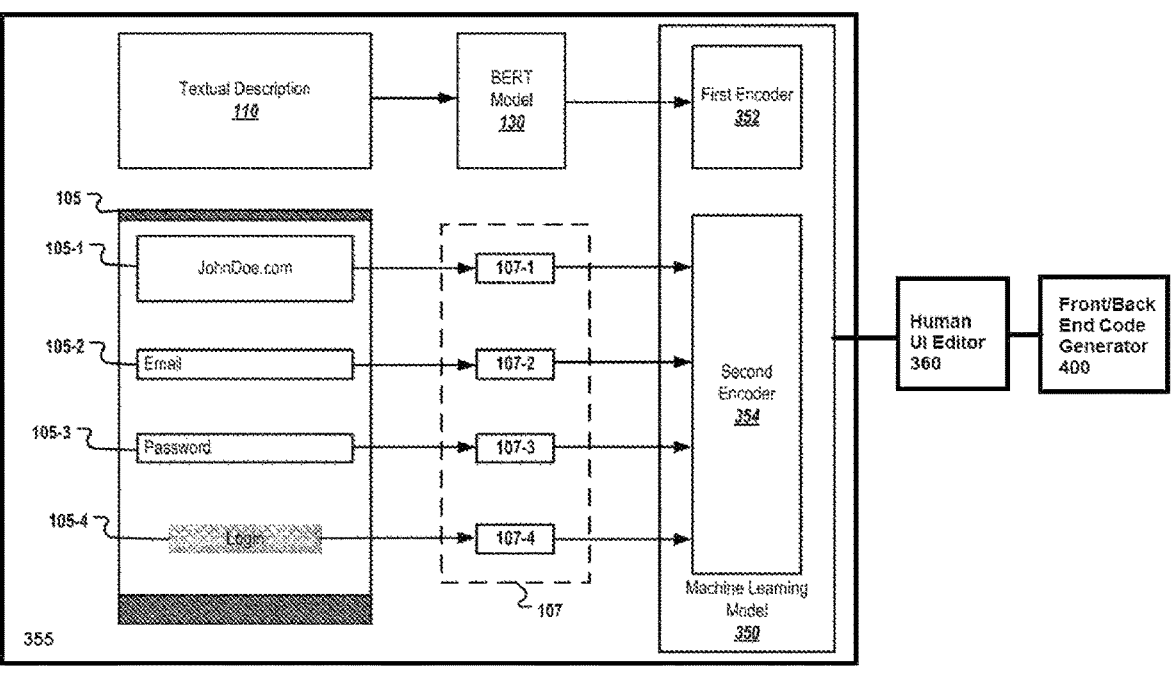
FIG. 1C illustrates an AI UI system operating with a graphic design system for a computing device of a user, and an automatic front-end and a back-end code generator, according to one or more examples.
Figure 1D:
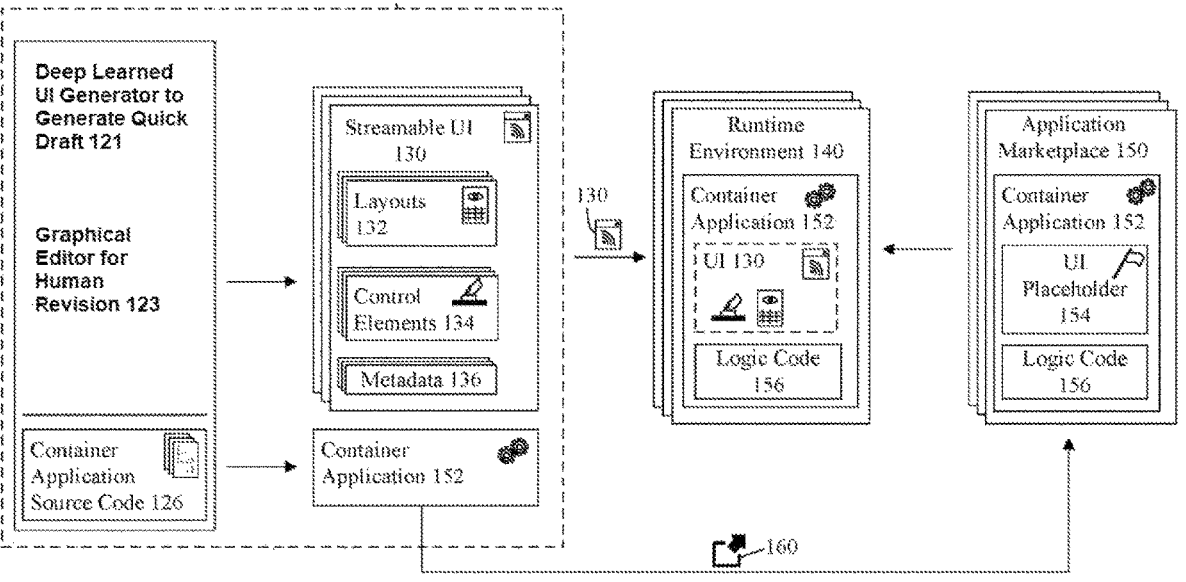
FIG. 1D is a schematic diagram illustrating an embodiment for utilizing cross platform streamable user interfaces to reduce software deployment frequency caused by user interface improvements in accordance with an embodiment of the inventive arrangements disclosed herein.

FIG. 1B illustrates an AI UI system operating with a graphic design system for a computing device of a user, and an automatic front-end code generator, according to one or more examples. FIG. 1C illustrates an AI UI system operating with a graphic design system for a computing device of a user, and an automatic front-end and a back-end code generator, according to one or more examples. FIG. 1D is a schematic diagram illustrating an embodiment for utilizing cross platform streamable user interfaces to reduce software deployment frequency caused by user interface improvements in accordance with an embodiment of the inventive arrangements disclosed herein.

FIG. 1B shows in more details one exemplary system to apply AI to generate the first UI draft, then use a UI design editor to perfect the UI design, and lastly apply a front end code generator to generate human readable code such as HTML, CSS or Javascript. FIG. 1B is a block diagram of an example system 100 that implements a machine learning model 150 that generates a GUI from a text description. The machine learning model 150 is trained on a training dataset that includes multiple training samples where each training sample includes an image of a GUI and a corresponding textual description of the GUI. When trained with images, we can generate images. The system can create the UI in PFS from the image and in case can train the AI with code that describes the components and properties the user wants to generate. In the example of FIG. 1B, the system utilizes a transformer-based generative model to generate UI element attributes directly from text descriptions. In this example, the system uses a bidirectional encoder representation from transformers (BERT) to generate embedding vectors to represent textual descriptions. Also in this example, the machine learning model 150 is a transformer based machine learning model having an encoder 152, a decoder 154 and multiple GMM models.

In some implementations, the system 100 preforms preprocessing on the training data set. As mentioned above, training a machine learning model 150 to generate a GUI requires a training dataset that includes multiple training samples where each training sample includes an image of a GUI and a corresponding natural language textual description that describes the GUI. For example, if a training sample depicts a login screen with graphical elements such as two textboxes and a submit button where the first textbox is for providing username and the second textbox is for providing password, the textual description can include "a login screen" or "a login screen with two textboxes and a button." Each training sample can also include a structural representation of the graphical elements of the sample GUI. For example, each training sample can also include a JSON file where each node corresponding to a graphical element contains various properties of the graphical element such as class, visibility to the user and the bounds of the element.

Prior to training the machine learning model 150, the system 100 preprocesses the training dataset so as to convert each training sample into a format so that the machine learning model 150 can understand and process the natural language, free-text words, phrases of the textual description and the graphical elements of the GUI. In some implementations, in order to process textual description in natural language, the textual description is pre-processed and transformed into vectors of real numbers using one of any appropriate embedding technique.

In some implementations, the system 100 sorts the UI elements based on their approximate Y coordinates. If two elements have approximately equal Y coordinates, the system then sorts them by their X coordinates. This creates an order where top left UI elements always exist earlier than elements in the bottom right in the sequence.

To make a machine learning model 150 understand and process the natural language textual description, free-text words and phrases of the textual description can be transformed into numeric values. For example, the system 100 can use one-hot encoding to generate a binary vector for each distinct word of the textual description such that each distinct word stands for one dimension of the binary vector and a binary value of the respective word indicates a (1) for the word and (0) otherwise.

In another example, the system 100 can use word embeddings to represent words and phrases of the textual description in vectors of (non-binary) numeric values with much lower and thus denser dimensions by exploiting the similarity and hidden semantic relationships between words. To generate a vector, the system 100 can train using encoding algorithms such as skip-gram model or continuous-bag-of-words (CBOW) models on a text corpus to generate an embedding matrix that includes a list of all words and their corresponding embeddings based on the vocabulary of the text corpus. After generating an embedding matrix, the system 100 can perform a look-up operation on the embedding matrix to select an embedding vector for a particular word in the textual description.

In some implementations, the system 100 can also use bidirectional encoder representations from transformers (BERT) to extract features, namely word and sentence from the textual description of the UIs.

The system trains a machine learning model using graphical attribute data and embedding vectors. For example, the machine learning model 150 is trained by adjusting a plurality of training parameters of the machine learning model 150 using a training process implemented by the system 100. The training process for the machine learning model 150 is an iterative process that samples a training sample from the training dataset. After sampling, the training process generates the graphical attribute data for the GUI of the training sample and also generates the embedding vectors to represent the textual description of the GUI in the training sample. After generating the graphical attribute data and the embedding vectors, the training process uses the machine learning model 150 to generate prediction data that indicates graphical elements of a predicted GUI. The system generates prediction data for the predicted GUI. For example, after training the machine learning model 150 and during prediction a textual description of a GUI that generally describes the GUI is provided by the user of the system. For example, if the user wants a GUI with a login page with two buttons, the textual description can be something similar to "login page with two buttons." The system 100 renders the predicted GUI ready for editing by a user using a graphics design system. For example, after generating the prediction data that includes graphical elements of the predicted GUI, the system 100 uses the prediction data to render the predicted GUIs. For example, the system 100 can include a rendering apparatus that implements automated techniques and methods that can process the prediction data to render the predicted GUIs. In some implementations, the rendering apparatus can render the predicted GUIs as a Hypertext Markup Language (HTML) document. However, depending upon the implementations, other markup languages such as Standard Generalized Markup Language (SGML) or Extensible Markup Language (XML) can also be used.

In some implementations, the machine learning model 150 can be a dual encoder machine learning model that includes a first encoder 352 and a second encoder 354. The first encoder 352 and the second encoder 354 can respectively include multiple neural network layers where each neural network layer can include multiple neural network nodes and a multiple training parameters. In some implementations, the first encoder 352 and the second encoder 354 can be transformer based encoders that includes multiple self-attention layers and cross attention layers. In some implementations, the first encoder is a text encoder and the second encoder is a UI encoder.

FIG. 1C illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, a design user may initiate a session to implement the IGDS 100 for purpose of designing a run-time user interface for an application or program. In examples, the IGDS 100 includes a program interface 102, a design interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the design interface 118, to enable the design user to provide input for creating and/or editing the design of the user interface.

According to some examples, the design interface 118 can be implemented as a functional framework that is integrated with the canvas 122 to detect and interpret user input. The design interface 118 can, for example, use a reference of the canvas 122 to identify a screen location of a user input (e.g., 'click'). Additionally, the design interface 118 can interpret an input action of the design user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the design user can specify (e.g., right-click, screen-tap, etc.) through one or more input devices. In this manner, the design interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the design user. The retrieved data sets can include one or more pages that include design elements which collectively form a UI design under edit. Each file 101 can include one or multiple data structure representations 111 which collectively define the design interface. The files 101 may also include additional data sets which are associated with the active workspace.

In examples, the rendering engine 120 uses the data structure representations 111 to render a corresponding UI design under edit 125 on the canvas 122, wherein the UI design under edit 125 reflects graphic elements and their respective attributes as provided with the individual pages of the files 101. The design user can edit the UI design under edit 125 using the design interface 118. Alternatively, the rendering engine 120 can generate a blank page for the canvas 122, and the design user can use the design interface 118 to generate the UI design under edit 125. As rendered, the UI design under edit 125 can include graphic elements such as a background and/or a set of objects (e.g., shapes, text, images, programmatic elements), as well as attributes of the individual graphic elements. Each attribute of a graphic element can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the UI design under edit 125.

In examples, individual design elements may also be defined in accordance with a desired run-time behavior. By way of example, some objects can be defined to have run-time behaviors that are either static or dynamic. The attributes of dynamic objects may change in response to predefined run-time events generated by the underlying application that is to incorporate the UI design under edit 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more attributes of the object may change based on user-input during the run-time of the application.

The design interface 118 can process at least some user inputs to determine input information 127, where the input information 127 indicates (i) an input action type (e.g., shape selection, object selection, sizing input, color selection), (ii) an object that is directly indicated by the input action (e.g., object being resized), (iii) a desired attribute that is to be altered by the input action, and/or (iv) a desired value for the attribute being altered. The rendering engine 120 can receive the input information 127, and the rendering engine 120 can implement changes indicated by the input information 127 to update the UI design under edit 125. When changes are implemented to the UI design under edit 125, the changes can also be reflected in the accompanying data structure representations 111 for the UI design under edit 125.

A code generator 111 can receive the input 118 and automatically generates human readable front-end code for the UI design as detailed in FIG. 1C.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web-resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the design user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

The service component 160 can retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

The service component can also retrieve files which define one or more variant components that were created in prior sessions and/or with other projects. The variant components which are created, or accessed and used with the active workspace, can be saved in association with the active workspace. Additionally, in some examples, such variant components can be stored in a directory or design library, which can be located on the user computing device 10 or network computing system 150.

In examples, the service component 160 provides a representation 159 of the workspace associated with the design user to the web-based application 80, where the representation identifies, for examples, individual files associated with the design user and/or user account. The workspace representation 159 can also identify a set of files, where each file includes one or multiple pages, and each page including objects that are part of a design interface.

On the user device 10, the design user can view the workspace representation through web-based application 80, and the design user can elect to open a file of the workspace through web-based application 80. In examples, upon the design user electing to open one of the active workspace files 163, web-based application 80 initiates the canvas 122. For example, the IGDS 100 can initiate an HTML 5.0 canvas as a component of web-based application 80, and the rendering engine 120 can access one or more data structures representations 111 of a UI design under edit, to render the corresponding UI design under edit 125 on the canvas 122.

In examples, the changes implemented by the rendering engine 120 to the UI design under edit 125 can also be recorded with the respective data structure representations 111, as stored on the computing device 10. The program interface 102 can repeatedly, or continuously stream change data 121 to the service component 160, wherein the updates reflect edits as they are made to the UI design under edit 125 and to the data structure representation 111 to reflect changes made by the design user to the UI design under edit 125 and to the local data structure representations 111 of the UI design under edit 125. The service component 160 can receive the change data 121, which in turn can be used to implement changes to the network-side data structure representations 161. In this way, the network-side data structure representations 161 for the active workspace files 163 can mirror (or be synchronized with) the local data structure representations 111 on the user computing device 10. When the rendering engine 120 implements changes to the UI design under edit 125 on the user device 10, the changes can be recorded or otherwise implemented with the local data structure representations 111, and the program interface 102 can stream the changes as change data 121 to the service component 160 in order to synchronize the local and network-side representations 111, 161 of the UI design under edit 125. This process can be performed repeatedly or continuously, so that the local and network-side representations 111, 161 of the UI design under edit 125 remain synchronized.

As described with examples of FIGS. 1A-1B and elsewhere, the IGDS 100 can implement the variant component logic 108, to enable a design user to create variant components. In some examples, the IGDS 100 can implement the variant component logic 108 to store newly created variant components as part of a network design library 165. When variant components are retrieved for use with a given project, the IGDS 100 can store the variant component with the UI design under edit 125. Thus, for example, a file or data set representing variant components that are in use with the UI design under edit 125 can be made a part of the working files for a given project.

FIG. 1C shows an embodiment to automatically generate human like front-end code using an editor such as the Figma™ tool. Figma™ is a popular design tool used for creating user interfaces and other visual designs. When a user creates a design in Figma™, they can export the design in a variety of file formats, depending on their needs.

Figma™ is a web-based UI design tool with an intuitive interface and a library of components. Figma™ has a range of built-in symbols, shapes, and components that cover more than 90% of user design needs. Figma™'s interface is built around real-time collaboration, so it's great for keeping team members on the same page. Figma™ uses vector graphics rather than pixels, meaning you can resize things without losing quality. Figma™ can export PNG file format, which is a raster image file format that is widely supported and can be used in a variety of contexts, including web design, print design, and digital marketing. PNG files are lossless, which means they maintain their quality even when resized or compressed. Figma™ can also export designs in vector file formats, such as SVG (Scalable Vector Graphics) and PDF (Portable Document Format). These file formats are resolution-independent and can be scaled to any size without losing quality. This makes them ideal for designs that need to be displayed on a variety of devices or printed at different sizes. In addition to these standard image and vector file formats, Figma™ also supports export to a number of specialized formats, such as Android and iOS app assets, CSS code, and Zeplin project files. These formats are designed to streamline the development process for specific platforms or tools, allowing designers to export their designs directly into the tools that developers use to build apps and websites.

Figure 5A:
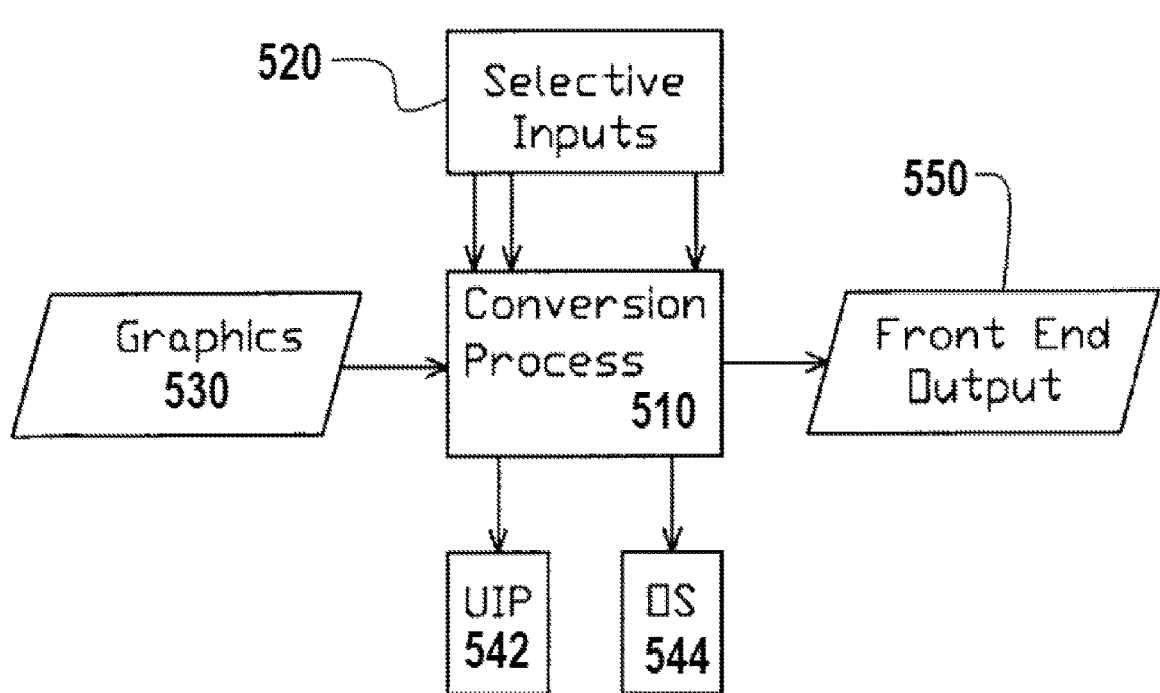
FIGS. 5A-5B show exemplary embodiments to provide cross-platform UI automatic code generation such as those done by PixelFree Studio software.

FIG. 5A shows an inventive functional model for a graphical user interface programming system. The functional model 100 is anchored by a conversion process 510 that converts a variety of inputs (520-542, described next) into a front end output 550. For example, selective inputs

520, such as cross-language control states, cross-language layouts, audio/video (A/V) controls, or animations, for example, may be accepted by the conversion process 510. Similarly, user-defined graphics 130 (such as vector or bitmap graphics, for example) may be provided in forms such as buttons, photographs, animations or movies to the conversion process 510. Additionally, the conversion process 510 is adapted to also receive inputs from the UI Platform 542 that can receive Figma™ files and an operating system 544, such as a MacOS®, Windows®, or Linux®, for example. The font end output 550 is code adaptable for use by any Graphical User Interface (GUI)-based environment.

One exemplary system for importing design prototypes includes one or more of the following:

a user interface for receiving a design file key and access token.

a communication module for sending HTTP GET requests to Figma™'s REST API to retrieve Frames and thumbnails.

a display module for presenting the Frame thumbnails to the user.

a selection module for capturing user selection of Frames for import.

a retrieval module for sending HTTP GET requests to retrieve Frames and components.

an adjustment module for modifying component names.

an import module for importing Frames and components into Pixelfree Studio.

The above system for importing a design prototype from Figma™ into Pixelfree can perform the following steps:

Receiving a design file key and an access token associated with the design file.

Sending a shallow HTTP GET request to Figma™'s REST API using the design file key and access token to retrieve the outermost Frames within the project.

Sending an HTTP GET request to obtain thumbnails of the Frames.

Displaying the thumbnails in Pixelfree Studio and enabling user selection of Frames for import.

Saving the selected Frame IDs for further processing.

Sending an in-depth HTTP GET request to retrieve the selected Frames along with their components.

Retrieving image files used within the Frames through separate HTTP GET requests.

Adjusting component names for uniqueness.

Importing the Frames and associated components into Pixelfree Studio.

The software algorithm accepts at least one graphic file such as the Figma™ file processed as described above and representing at least a portion of an intended graphical user interface for a computing device application. In one embodiment, the software algorithm may accept at least one of a Figma™ file, a vector graphic file, and a similar graphic file. The software algorithm preferably parses the graphic file, including:

parsing separate elements of the graphic file, parsing different layers of the graphic file, parsing separate zones of the graphic file, or parsing any suitable combination of these components.

The software algorithm also accepts information describing the receiving computing device. This information may include a device manufacturer, a device model, a type and a version of the operating system on the receiving computing device, or any other suitable information that describes the native code environment on the receiving computing device. The software algorithm preferably recursively selects from a plurality of (and preferably at least three) templates for software code describing at least one portion of a graphical user interface in a native code language, where the templates are preferably relevant to the native code environment on the receiving computing device 340, and where the purpose of the recursion is to select the template that most closely matches the graphic input file as well as the additional input information.

This allows the software algorithm to have a code structure for at least one portion of the graphical user interface in the appropriate native code environment, which can then be modified and refined to appropriately represent the input graphic file (and any other input information) and to do so in the native code environment for the receiving computing device 340. In one embodiment, where multiple pages, multiple variations, and multiple portions of the graphical user interface are input into the software algorithm, this process may be repeated for each of multiple pages, multiple variations, and multiple portions of the graphical user interface. The software algorithm preferably selects a template to match at least one of sizing, colors, position, layout, and function of the information that was input into the software algorithm to describe the desired graphical user interface.

In one embodiment, the software algorithm selects from at least two native code templates related to features of a graphical user interface include code templates related to at least one of buttons, text areas, animations, photographs, movies, text entry fields, interfaces with backend application code. Here, the software algorithm preferably selects the appropriate feature template for at least one of the features in at least one of the at least one input graphic file and additional input information describing the intended graphical user interface. As an example, if a button is described by at least one of the input graphic files (and the additional input information), the software algorithm selects from at least two button templates describing buttons in the native source code environment of the receiving computing device, and picks the template most closely depicting the button matching the input information.

This selection process can be applied to any feature in the input graphic file, or the corresponding additional input information. In this variation, the software algorithm modifies the code of the feature template to most closely represent at least one of the input graphic and input information for that feature, as well as to ensure that feature appropriately interfaces with any required backend application information and code. This process may be repeated for all relevant features if necessary.

In one embodiment, the software begins with a input graphic act whereby the algorithm receives an input of a graphic file representing at least a portion of a GUI. Next, in an input object act, the algorithm accepts an object as input to be part of the GUI.

Objects include, for example, (A) button descriptions/buttons, B) photographs, C) animations, D) movies, E) a story board for the path a user can follow through the graphical user interface, F) tables for displaying information, or G) a timeline for the actions and activity of the graphical user interface. Additionally, the algorithm receives, in an ID Output Device act, input information describing the intended receiving computing device. Accordingly, in one embodiment the software algorithm may include a "listener" in the output source code to detect the screen size on the receiving computing device 340, where the output graphical interface source code chooses from between at least two versions of the graphical user interface based on the detected screen size on the receiving computing device (described below).

In this embodiment, at least two versions of layouts exist for at least one portion of the GUI, and these are input to the software algorithm in the ID Output Device Act. Accordingly, the software algorithm next proceeds to a select template act. In the select template act, the algorithm develops native source code for each of at least two layouts to generate at least two separate segments of native source code for two corresponding layouts of the GUI. Accordingly, when the screen size of the receiving device 340 is detected, the algorithm then selects and loads the appropriate native source code segment for the layout that best suits the detected screen size. This allows the algorithm to create a GUI adaptive to devices with different screen sizes (and to altogether different devices) as described below. Turning back to the present state of the algorithm, next the algorithm modifies the selected template code to match the input graphics and information in a modify template act. Then, in a create features act, the algorithm creates features within the input graphics and information by selecting between a plurality of templates describing features for the objects (A)-(G), for example, above.

Next, in a detect screen size query, the algorithm determines if different layouts were input for different screen sizes. If so, as illustrated by the "Y" path, the algorithm uses a listener code via the output native code to detect the screen size of the receiving (aka target) computing device, and then proceeds to return to the input graphic act whereupon the algorithm is repeated once for each layout. If only one screen layout is used, as illustrated by the "N" path, the algorithm proceeds to a compile code act 480, whereby the template files, including code native to the receiving computing device, is compiled for the receiving computing device. Next, in an output native source code act 490 native source code is sent/output for the GUI of the receiving device, whereby the output native source code may be sent to the receiving device. In one embodiment, the native source code is exported and combined with the back-end application source code and the entire native source code application is transferred to the receiving computing device.

In the Figma™ embodiment, the software algorithm parses the user interface tree, and then:

- recursively selects the appropriate templates for each portion of the tree, modifies those templates to create output native source code,
- selects feature-based templates for any relevant features,
- modifies those feature-based templates, and
- updates the overall templates with the adjusted feature-based native source code.

This creates a more-complete graphical user interface code in the native source code appropriate for the receiving computing device. Upon reading this disclosure, other variation and processes for achieving substantially similar results are apparent to those of ordinary skill in the software programming arts.

Figure 5B:
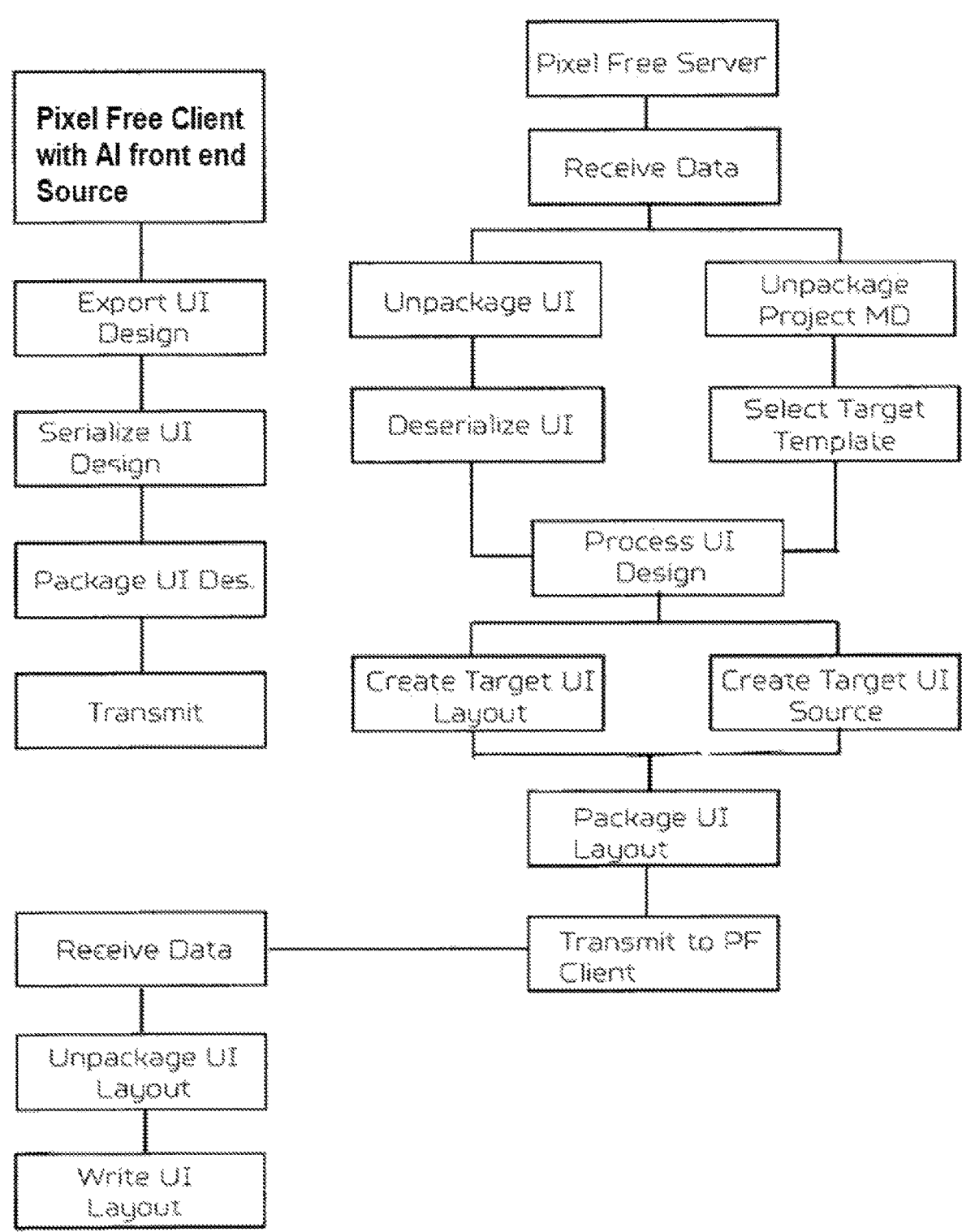

In one alternative alternative shown in FIG. 5B, at least a portion of the software algorithm may be executed on a remote computing server with at least one additional processor and at least one additional computer readable non-transitory storage medium, such as those located in cloud computing (for example, via PixelFree Server, Receive Data, Unpackage UI Design-Deserialize UI Design/Unpackage Project Metadata-Select Target Template from Project Metadata, Process UI Design, Create Target UI Layout Files/Create Target UI Source Code Files, Package UI Layout and UI Source Code Files, Transmit to PixelFree Client of FIG. 5B, below). In this embodiment, an additional alternative is to use a local and cloud-based computing processors to executing the software algorithm and thus collaborate to deliver the output native source code.

In an another alternative, elements including animations, movies, audio, pictures, buttons, and text input areas are described in the input graphic files and the additional input information. The software algorithm 400 then develops native source code for each of these elements that are included in the input graphic files (along with the additional input information). Upon reading this disclosure, other variation and processes for achieving substantially similar results are apparent to those of ordinary skill in the software programming arts.

FIG. 5B shows an over-arching architecture of and flow for one programming system according to the teachings of the invention, and the following forms a general description thereof. When developing software today, a UI screen is typically exported to a specific template before data integration begins on individual UI elements or UI Components. By contrast, the present invention completes data integration with UI elements in the developer's client machine via a UI Platform. This allows UI developers to map a UI element to a web service for real time data population of that UI element.

The PixelFree Client, shown in the PixelFree Client Box, is a UI Layout and Design tool that provides responsive UI, image, audio video and animation manipulation. When exported from the UI Platform (Export UI Design, Serialize UI Design, Package UI Design and Project Metadata, and Transmit to PixelFree Server), a web services connection code is generated for a template's native language and platform. For example, assume that a UI in the UI Platform comprises a standard List View known in the computer programming arts, that each row in the list view represents an item corresponding to a single data record, and that each data record may consist of one or more data fields. Furthermore, assume that the list view represents the results of a search for a "Coffee Shop" near the user who is performing the search.

Each item in the list view would represent a single coffee shop and could include relevant information such as: a thumbnail image of the coffee shop, the name of the coffee shop, the distance to the coffee shop, and a rating for the coffee shop. By allowing the List View to be connected via the UI Platform to the web service that provides this data, the programmer can see in real time what a user interface would look like on each target platform (or hardware device). Accordingly, the UI Platform simplifies the backend programming requirements because it produces code required to connect a UI element to the data it represents.

The components created, designed, and manipulated in the UI Platform are called UI Components, or synonymously, Data Aware Components. One natural extension of Data Aware Components is the ability to attach programming logic to a UI object. Accordingly, each UI element can be programmed, and when exported, the UI and associated logic is converted by a template to a (sometimes) different programming language. In a preferred embodiment, the preferred programming language for the UI Platform/client is JavaScript.

For example, a calculator App that performs basic operations on positive integers is created. On the interface, there are 10 digits [0-9], five operations [+−*/=], a clear function, and an input/output (I/O) alpha-numeric field, such as an LCD display, so a user can view what has been entered. In the past before the UI Platform, a UI would have to be exported to a particular native platform before each UI element could be programmed to perform designated/desired operations by a programmer. However, using the UI Platform, that programmer is able to add code logic directly (such as with JavaScript).

Continuing with the example, the programmer enables each digit UI element to update the alpha-numeric field with the value the button represents. Accordingly, if a user presses the number "5", the number 5 appears on the alpha-numeric field. The programmer also implements logic for the operations: +−*/. Accordingly, a user may enter mathematical expressions such as 4+5*3. Then, the user could make the equals sign (=), a UI element created to be a Data Aware Component, that takes the entered information on the text field, sends it to a web service that performs the calculation, and then updates the alpha-numeric field UI with the result of that expression.

Accordingly, a programmer may now export a functional UI to any template and have an App that behaves substantially the same across various platforms using optimized native code for that platform. The benefits to productivity are readily apparent to those of skill in the computer programming arts.

In the past, when a UI was exported from a client, it is transmitted to a server, converted to the language and platform dictated by a template, sent back to the requesting computer, and written to the target project's directory. The process is complete as the UI makes the entire round trip, and is represented as: client→server→client.

The UI Platform adds the capability to store UI objects in a Cloud environment (said Cloud being understood by those of skill in the computer programming arts). Here, a UI object can then be requested in the future. For example, at a requested time, the UI object converts through a template (as specified by the requesting client) and is then transmitted to the requesting client. In this scenario, the client that creates the UI object may be different from the client that requests the UI object.

This allows for unique features that are difficult to achieve using traditional approaches. For example, consider an App developer that wants to create a weather App for a Windows® platform. Using current methods, the App developer might initially create the App using the C #programming language. In this case, the UI is built directly using C #'s GUI library and tools, and the programming logic uses C #'s data structures and coding constructs. Once complete, the developer packages the App and releases it as an executable file through the Windows App Store®.

When a developer wants to create the same App for the MacOS platform, they use a different programming language (i.e. Swift) and different UI tools. The final App is then packaged and released through the MacOS App Store. If the developer wants to make an update to the UI, they must do so on two different platforms and then release two new versions of the software. End-users then update to the new version of the App to see the changes.

By contrast, with the UI Platform, the approach is simpler. The App developer/programmer creates the UI, and programs each UI element entirely from the UI Platform client. The UI and logic are then sent to and stored on the Cloud. At this point, the app developer creates a container (or shell) program for the Windows® platform (PixelFree Server, Receive Data, Unpackage UI Design-Deserialize UI Design/ Unpackage Project Metadata-Select Target Template from Project Metadata, Process UI Design, Create Target UI Layout Files/Create Target UI Source Code Files, Package UI Layout and UI Source Code Files, Transmit to PixelFree Client). The shell program, at runtime, requests the UI from the Cloud based on which screen is being presented to the user. Before fulfilling the request, the Cloud service converts the UI objects to the requested template (C #and Windows) and then sends appropriate data, which may comprise visual data.

The Cloud also contains interactive elements as programming logic is originally attached during the creation process. When the developer wants to create the same weather App on a Mac® platform, they write the shell program for that platform, and request the same UI objects. The client request, in this case, specifies the template as Swift+MacOS so that code produced is native to the platform. Neither the UI, nor the programming logic is rewritten, because they are stored in a platform independent manner and converted to a native format at runtime.

Accordingly, when the app developer wants to make changes to the UI, they simply update the UI objects and logic stored in the Cloud. Thus, one advantage is that by using a unique serial ID, the shell programs on Windows and MacOS may detect that their UI's are out of sync with the latest locally-cached version and request the updated versions from the Cloud.

Thus, the developer pushes an update to the end-user without needing to rebuild, repackage, and upload the new version to the appropriate distribution platform (Windows App Store, MacOS App Store), and the user instantaneously receives UI updates without needing to do anything, including updating that App on their device. This is illustrated as Receive Data, Unpackage UI Layout and Source Code Files, and Write UI Layout and Source Code Files to Target Project. Accordingly, UI's are streamable and interactive across multiple platforms for which templates are available, greatly simplifying the native App development process. As an optimization, the Cloud caches compiled versions of the UI based on each template and serves future requests with that version (of course, until it is changed).

Advantageously, the UI Platform creates an environment of open collaboration among UI designers, enabling UI designers register as vendors on a Marketplace(s) where the UI designs and are available for free or for a fee. Third-party developers may then reuse those designs in their own Apps by requesting the UI via its identification (ID). For example, assume a UI designer creates an interactive and streamable Calendar design. Another App developer that is building a wedding planner App, may search a Marketplace for suitable calendar designs. Upon selecting the Calendar design developed, they simply code a shell App to request the design and provide the necessary data to ensure that it is functional for the needs of their App.

The UI Platform's interactive and streamable UIs, preferably using a template system, opens the door for creating content on proprietary and secure systems. Consider as an example the cable and television industry. With the UI Platform one can create dynamic television advertisements. Using built-in animation capabilities of the UI Platform, advertisers can create commercials and store each as a hosted UI object in the Cloud.

Similarly, television manufacturers may provide templates that define ways to utilize their software and hardware platform(s). The same advertisement may thus play on a multitude types of televisions, but unlike pre-existing television advertisements, the advertisement created by the UI Platform takes full advantage of each television's capabilities. Furthermore, by using UI objects, the amount of resources (data transfer bandwidth, and electricity, for example) consumed is substantially less than streaming in a pixel-based video format.

In the scope of military operations, the disclosed UI Platform Cloud approach to design and programming has advantages. The UI Platform's interactive and streamable UIs allow UI designers to create interfaces for a wide range of proprietary hardware used by the military. Accordingly, each template describes the software and hardware systems for a target platform. However, by designing the UI in the UI Platform and storing it in a base UI language, designers can target future (yet to exist) hardware platforms (and software). This allows designers and developers to reuse and standardize designs across generations of hardware and software, thus future-proofing the relevant technology infrastructure.

As used herein, a model-view-controller (MVC) can be a software architectural pattern for implementing user interfaces on computers. MVC can divide a given application into three interconnected parts in order to separate internal representations of information from the ways that information is presented to and accepted from the user. MVC design pattern can decouple these major components allowing for efficient code reuse and parallel development. MVC is coupled with a framework which can include libraries that can provide a layer of abstraction on top of the core language. The functionality of the framework is to assist in structuring the code-base and separating the concerns of an application into the three parts: model, view, controller.

The model can be the central component of the pattern. The model can express the application's behavior in terms of the problem domain, independent of the user interface. The model can directly manage the data, logic, and rules of the application. The view can be any output representation of information, such as a chart or a diagram. Multiple views of the same information can be possible, such as a bar chart for management and a tabular view for accountants. The third part, the controller, can accept input and can convert the input to commands for the model or view.

In addition to dividing the application into three kinds of components, the model-view-controller design can define the interactions which can occur between the components. The model can store data that can be retrieved according to commands from the controller and displayed in the view. The view can generate the new output to the user based on changes in the model. The controller can send commands to the model to update the model's state (e.g., editing a document). The controller can also send commands to its associated view to change the view's presentation of the model (e.g., scrolling through a document). It should be understood that the disclosure leverages a decoupled approach to MVC permitting the view and controller to be substantially decoupled from the model of the architecture. In this manner, container application 152 can remain largely unmodified in the presence of major user interface improvements.

As used herein, source code can be any collection of computer instructions, possibly with comments, written using a human-readable programming language, usually as ordinary text. The source code of a program can be specially designed to facilitate the work of computer programmers, who specify the actions to be performed by a computer mostly by writing source code. The source code can often be transformed by an assembler or compiler into binary machine code understood by the computer. The machine code might then be stored for execution at a later time. Alternatively, source code can be interpreted and thus immediately executed. Generated code 124 can be source code which when executed interoperates with a target native runtime environment 140 in absence of a software framework. That is, native code includes native environment 140 specific operations and/or processor specific instructions which can be executed on a specific processor (e.g., x86, ARM) using the instruction set of the processor. For example, code 124 can include commands for drawing a series of text fields, a set of buttons, and text labels associated with a login form of an application 152.

A binary (e.g., container application 152) can be a computer-readable sequence of bytes which permit the execution of computer instructions. Binary files can include headers and/or blocks of metadata used by a computer program to interpret the data in the file. Instructions can include machine code, bytecode, and the like. It should be appreciated that binaries can be platform specific based on the instruction set for which the binary is compiled. In one instance, application 152 can be produced from application source code 126 utilizing a cross-platform non-framework oriented (e.g., native code) approach. In the instance, application 152 can be produced for any digital marketplace 150, runtime environment 140, and the like.

UI 130 can represent a physical arrangement of one or more control elements 134 within a layout 132 (e.g., UI control element hierarchy). UI 130 can include, but is not limited to, control elements 134, media objects (e.g., video/audio), text objects, repeated elements (e.g., header, footer), animations, screen transitions, metadata 136 (e.g., state information), and the like. Layout 132 can include, but is not limited to, a linear layout, a table layout, a list view layout, a grid layout, and the like. Layout 132 can be static (e.g., StaticLayout), dynamic (e.g. Relative, AnchorPane, VBox, HBox), and the like. Layout 132 can generally involve organizational principles of composition to achieve specific communication objectives. Composition can include, but is not limited to, control element arrangement within canvas, control element spacing, control element appearance, control element reactive behavior, fonting (e.g., typeface, size), media arrangement within canvas, media size, media transparency, and the like. It should be appreciated that control element 134 can be associated with one or more UI states, including, but not limited to, hover, onclick, and the like. In one instance, UI 130 can be an object which can be a platform specific data structure which can be utilized by application 152 to render a UI. In the instance, the object can correspond to a runtime environment type, a programming language type, an integrated development environment type, and the like. It should be appreciated that an object can be a variable, a data structure, a function, or a method, and as such, is a location in memory having a value and possibly referenced by an identifier.

As used herein, a graphical user interface design tool 121 can be a software development tool that can simplify the creation of GUIs by allowing the designer to arrange graphical control elements 134 (e.g., widgets) using a drag-and-drop what-you-see-is-what-you-get (WYSIWYG) editor. Control elements 134 can include, but is not limited to, a button, a scrollbar, a checkbox, a radio button, a drop down list, a slider, an input field, a text area, a progress bar, and the like. For example, tool 121 can be a WIMP (Windows, icons, menus, pointers) graphical user interface integrated development environment (IDE).

Development environment 120 can be a computer system in which a computer program or software component can be created, deployed, and/or executed through one or more software tools. In one instance, development environment 120 can include, but is not limited to, UI builder 121, an IDE, marketplace 150 submission tools, software project management tools, error tracking and resolution software, and the like. In one instance, environment 120 can be utilized to compile container application source code 126 into an executable (e.g., binary) container application 152. In the instance, an IDE 120 can be utilized to produce application 152 which can be deployed to marketplace 160.

A cross platform user interface builder 121 can create a user interface archetype 123 within a development environment 120 utilizing one or more software development tools. In one instance, the user interface archetype 123 can be a visual arrangement of one or more control elements based on one or more layouts. In the instance, archetype 123 can be designed utilizing a drag-and-drop what-you-see-is-what-you-get (WYSIWYG) approach. It should be appreciated that user interface code (e.g., controller) can be associated with the user interface (e.g., view). In one embodiment, archetype 123 can be persisted within a data structure 122 including, but not limited to, a JAVA object (e.g., class, serialized object), a Javascript Object Notation (JSON) object, an Extensible Markup Language object, and the like. In one embodiment, structure 122 can be a view-controller object (e.g., VC Object 412) which can include, user interface programming instructions (e.g., layout classes), user interface control instructions, and the like. In the embodiment, structure 122 can encapsulate relevant computer instructions for enabling a streamable UI 130, including, but not limited to, metadata (e.g., for parsing the structure 122), timestamp information, versioning information, and the like.

In one instance, UI builder 121 can utilize data structure 122 to generate native code for a target native runtime environment 140. In the instance, instructions within data structure 122 can be directly translated into runtime 140 specific instructions prior to being conveyed to environment 140. That is, all cross-platform translation is performed for the runtime environment 140 by platform 112 and parsing/presentation of streamable UI can be performed using only functionality of the runtime environment 140. In one embodiment, UI builder 121 can produce adjustable layout programming instructions which can be integrated into application 126 (e.g., UI placeholder 154, streaming UI handler 256). In the embodiment, the adjustable layout programming instructions can be configured during runtime from UI 130 data and/or metadata.

As used herein, streaming can be a sequence of data elements made available over time. Streaming can utilize traditional and/or proprietary mechanism, protocols, and the like. For example, streaming UI can utilize traditional HTTP protocols to transmit one or more control elements 134 to environment 140. In one embodiment, streaming UI can be linked to container application utilizing traditional and/or proprietary mechanisms. Mechanisms can include, but is not limited to, Uniform Resource Identifiers (URI), hashes, and the like. In one instance, one or more logic code 156 bindings for linking control elements 134 to logic code 156 can be present prior to deploy 160. In the instance, bindings can include, but is not limited to, a name binding, UI data binding, and the like.

In one embodiment, application 152 executing in runtime environment 140 can present the streamable UI 130 in real-time or near real-time. In the embodiment, a placeholder 154 UI can be dynamically replaced and/or selectively modified. For example, an additional screen can be dynamically added to the login process of the container application 152 by an application 152 developer after the application 152 has been downloaded from the marketplace 150 and is executing on a mobile phone of a user. In this way, an application 152 developer can make innumerable changes to the UI 130 and dynamically deliver the UI without requiring application 152 to be deployed. Consequently, users are not forced to update the application 152 to have access to an updated version of UI 130.

Application marketplace 150 can be an e-commerce platform for providing digital content, applications, and/or assets. In one instance, marketplace 150 can be a GOOGLE PLAY STORE (e.g., Android), an APPLE ITUNES store (e.g., iOS), a MICROSOFT WINDOWS STORE (e.g., Windows), and the like. Marketplace 150 can persist container application 152 in a traditional manner since the apparent functionality of container application 152 is identical to a conventional platform specific application. It should be appreciate the advantage of the disclosure over traditional application is the reduction in submission and/or approval process frequency for application 152 resulting from UI improvements. It should be understood that subsequent UI improvements can be optionally subjected to a submission/approval process to ensure application 152 and/or UI 130 do not violate marketplace 150 guidelines/rules.

In one instance, UI placeholder 154 can be a framing mechanism for integrating layout instructions, arbitrary control elements (e.g., 134) within container application 152 and/or logic code 156. In the instance, placeholder 154 can include one or more overridable functions, data structures, state information, and the like which can permit control elements 134 to be linked (e.g., coupled) to code 156 during runtime 140. It should be appreciated that the disclosure is not limited to this exact arrangement and can utilize any traditional and/or proprietary coupling mechanism. For example, a rudimentary UI placeholder 154 can be deployed 160 to marketplace 150 to enable application 152 to receive user feedback on UI improvements for the placeholder 154. In the example, the UI improvements can be created from the feedback and delivered immediately to users via streamable UI 130 reducing user satisfaction delay significantly.

It should be appreciated that in one configuration of the disclosure, the application 152 can lack a user interface when deployed the application marketplace 150. That is, application 152 can include bindings (e.g., references) to UI 130 which can be utilized during application 152 runtime to generate a user interface. In another configuration of the disclosure, the application 152 can include a default user interface (e.g., stock interface) which can be selectively ignored during runtime and streamable UI instructions can be used to render the user interface.

Drawings presented herein are for illustrative purposes only and should not be construed to limit the invention in any regard. It should be appreciated that marketplace 150 can be an optional component of embodiment 110. In one instance, streamable UI 130 can be conveyed to limited resource devices to enable dynamic content delivery without modifying the executable of the limited resource device. For example, the disclosure can be leveraged to extend the content delivery ability of Internet of Things (IoT) devices and/or smart devices (e.g., smart TVs) by enabling post deployment UI changes to be affected during runtime.

Figure 2:
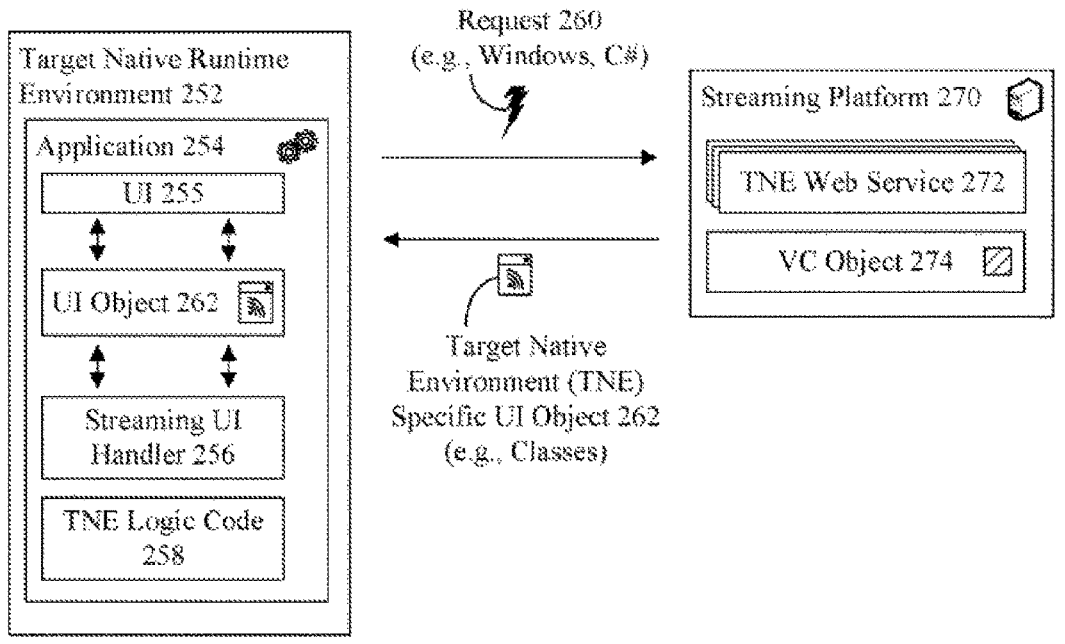
FIG. 2 is a schematic diagram illustrating a set of embodiments for utilizing cross platform streamable user interfaces to reduce software deployment frequency caused by user interface improvements in accordance with an embodiment of the inventive arrangements disclosed herein.

FIG. 2 is a schematic diagram illustrating a set of embodiments 210, 250 for utilizing cross platform streamable user interfaces to reduce software deployment frequency caused by user interface improvements in accordance with an embodiment of the inventive arrangements disclosed herein. Embodiments 210, 250 can be present in the context of embodiment 110, method 300, and/or system 400. Embodiment 210 can illustrate an exemplary name binding for a streamable user interface (UI) within a container application 214. Embodiment 250 can illustrate an exemplary Web-based service architecture for the disclosure.

In embodiment 210, a container application 214 can execute within a runtime environment of a device 212 (e.g., mobile phone). In one instance, one or more components of UI 216 can be dynamically conveyed to container application during runtime from a UI cache 220. In one instance, UI cache 220 can be a component of a streaming platform 112, 270. In the instance, UI cache 220 can persist application specific user interfaces (e.g., 222) and/or application specific control elements (e.g., 224). In one embodiment, UI 216 and/or control elements can each be associated with unique identifiers which can permit direct substitution of elements during runtime. In the embodiment, one or more UI handling functionalities (e.g., handler 256) can perform UI updates when UI improvements have occurred. In one use case, UI 216 can be associated with a unique identifier (UID) 1234. Each component control element of UI 216 can be linked to a different unique identifier A', B', C' corresponding to an element ID (EID) of 1234-A', 1234-B', 1234-C'. UI 222 obtained from cache 220 can include elements 1234-A, 1234-B, 1234-C which can be mapped to 1234-A', 1234-B', 1234-C' resulting in the replacement of 1234-A', 1234-B', 1234-C' with 1234-A, 1234-B, 1234-C. It should be understood that the functionality of embodiment 210 can be included within a larger process (e.g., reconciliation, change management). It should be understood that the functionality of the embodiment 210 can support any arbitrary class of changes and is not limited to the exact substitution mechanism described herein.

In embodiment 250, one or more functionalities of the disclosure can include a Web service 272 within a streaming platform. In the embodiment, a target native runtime environment (TNE) 252 can execute an application 254. Application 254 can include a target native environment logic code 258, a streaming UI handler 256, a UI object 262, and a UI 255. In one instance, UI object 262 can be transmitted in response to a Web based service request 260. In the instance, using request 260 information (e.g., runtime environment, language) TNE Web based service 272 can utilize VC object 274 to generate an appropriate target native environment specific UI object 262. That is, object can be a target native runtime environment independent format representing a UI archetype 123. For example, application 254 can request a UI object 262 from TNE Web based service 272 corresponding to a WINDOWS runtime environment in a C #language utilizing conventional mechanisms (e.g., parameters) of a traditional Web service request.

In the embodiment, the returned UI object 262 can provide one or more data structures (e.g., classes) which can be utilized to query and/or manipulate UI 255. In the embodiment, object 262 can include, methods for accessing UI 255 and/or relevant control elements, references to UI 255 control elements, UI metadata, and the like. In one embodiment, one or more programming language functionalities (e.g., reflection) can be utilized to inspect object 262, invoke object 262 methods, access object 262 members/elements, and the like. In the embodiment, the object 262 can be parsed through a class loader functionality of a programming language. For example, object 262 can be received as a C #serialized object or a compiled C #class which can be deserialized and loaded by a C #class loader. It should be appreciated that since the object is serialized (e.g. on the server), performance of application 254 is unaffected. It should be understood that a compiled class file can conform to any programming language which can be utilized with target native runtime environment.

As used herein, a class can be a set of instructions which can be executed on the target native runtime environment.

For example, a class can be a class file which can include JAVA bytecode which can execute within a Java Virtual Machine. The class can include, but is not limited to, class file identifier (e.g., Magic Number), a class file format version, a constant pool, access flags, class name, super class name, interfaces, fields, methods, attributes, and the like.

It should be appreciated that embodiment 250 can support change management functionality which can permit UI changes to be determined during application 254 runtime. In one instance, UI change determination can be performed at application 254 initialization, during post-initialization, and the like. It should be appreciated that a UI change determination can be performed by application 254, platform 270, and the like. In one instance, streaming handler 256 can perform request 260, update checking, and the like. It should be appreciated that handler 256 can be manually generated, automatically generated, and the like.

Drawings presented herein are for illustrative purposes only and should not be construed to limit the invention in any regard. It should be appreciated that, UI object 262 can be requested by application 252 or can be "pushed" to the application 252 responsive to object 274 changes.

Figure 3:
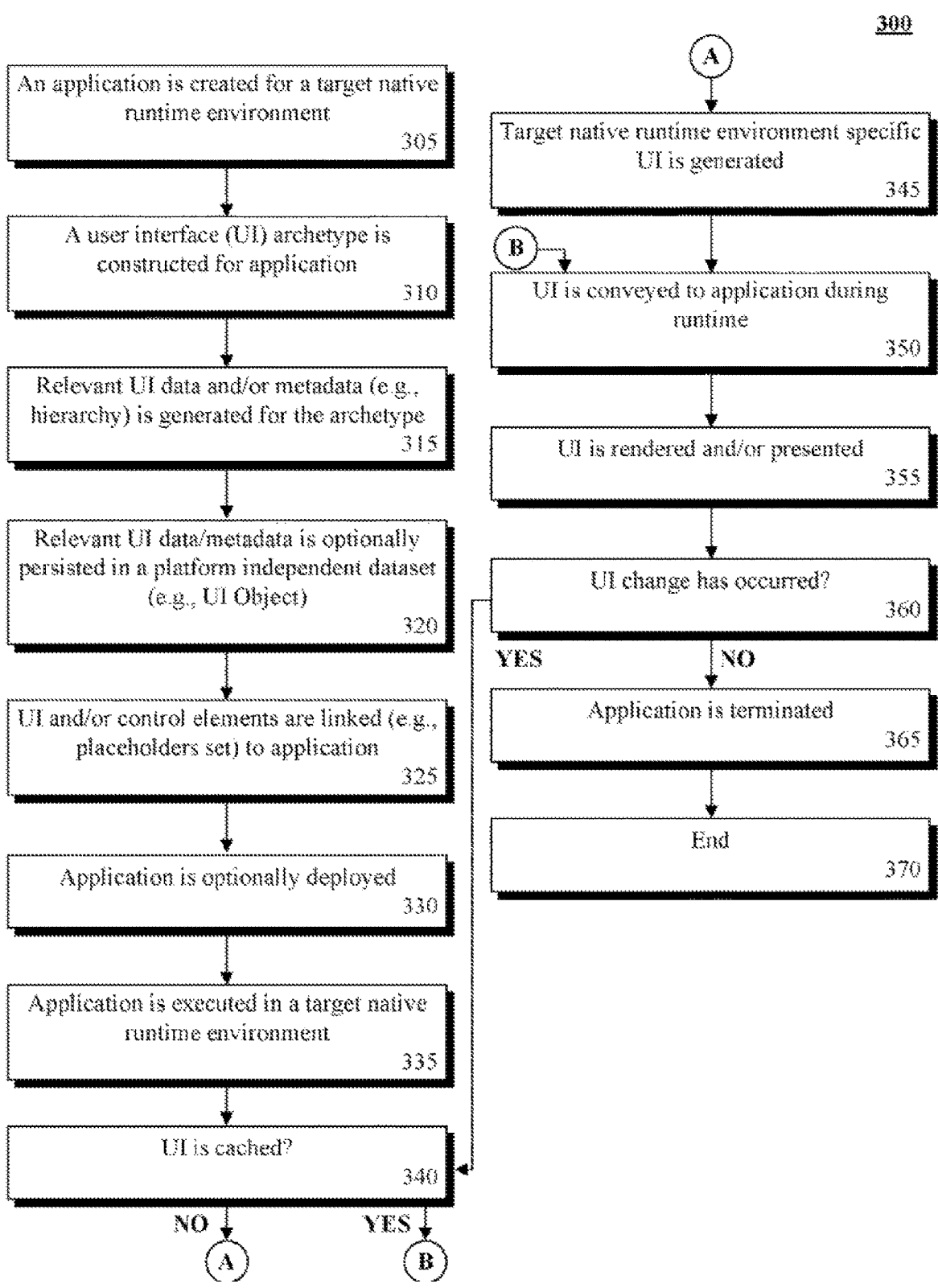
FIG. 3 is a schematic diagram illustrating a method for utilizing cross platform streamable user interfaces to reduce software deployment frequency caused by user interface improvements in accordance with an embodiment of the inventive arrangements disclosed herein.

FIG. 3 is a schematic diagram illustrating a method 300 for utilizing cross platform streamable user interfaces to reduce software deployment frequency caused by user interface improvements in accordance with an embodiment of the inventive arrangements disclosed herein. Method 300 can be present in the context of embodiment 110, 210, 250, and/or system 400.

In method 300, an application can utilize a streamable user interface to update an existing UI during runtime to include UI improvements. In the method, a platform independent UI object of a UI archetype can be persisted within a cloud based environment. The UI object can be conveyed to the application during runtime to enable a "live" update of the UI within the application.

In step 305, a container application can be created for a target native runtime environment. In step 310, a user interface (UI) can be constructed for the application. In step 315, relevant UI data and/or metadata can be generated for the UI. In step 320, the relevant data and/or metadata can be optionally persisted within a platform independent dataset. In step 325, the UI and/or related control elements can be linked to placeholders within the application. In step 330, the container application can be optionally deployed. In step 335, the application can be executed in the target native runtime environment. In step 340, if the UI is cached, the method can continue to step 345, else proceed to step 350. In step 345, the UI can be generated for the target native runtime environment. In step 350, the UI can be conveyed to the application during runtime execution. In step 355, the UI can be rendered and/or presented within a display. In step 360, if a UI change has occurred the method can return to step 340, else proceed to step 365. In step 365, the application can be terminated. In step 370, the method can end.

Drawings presented herein are for illustrative purposes only and should not be construed to limit the invention in any regard. Method 300 can be performed in serial and/or in parallel. It should be appreciated that the method 300 steps 305-370 can be performed in real-time or near real-time. In one instance, method 300 steps 340-360 can be iteratively repeated during method 300 execution.

Figure 4:
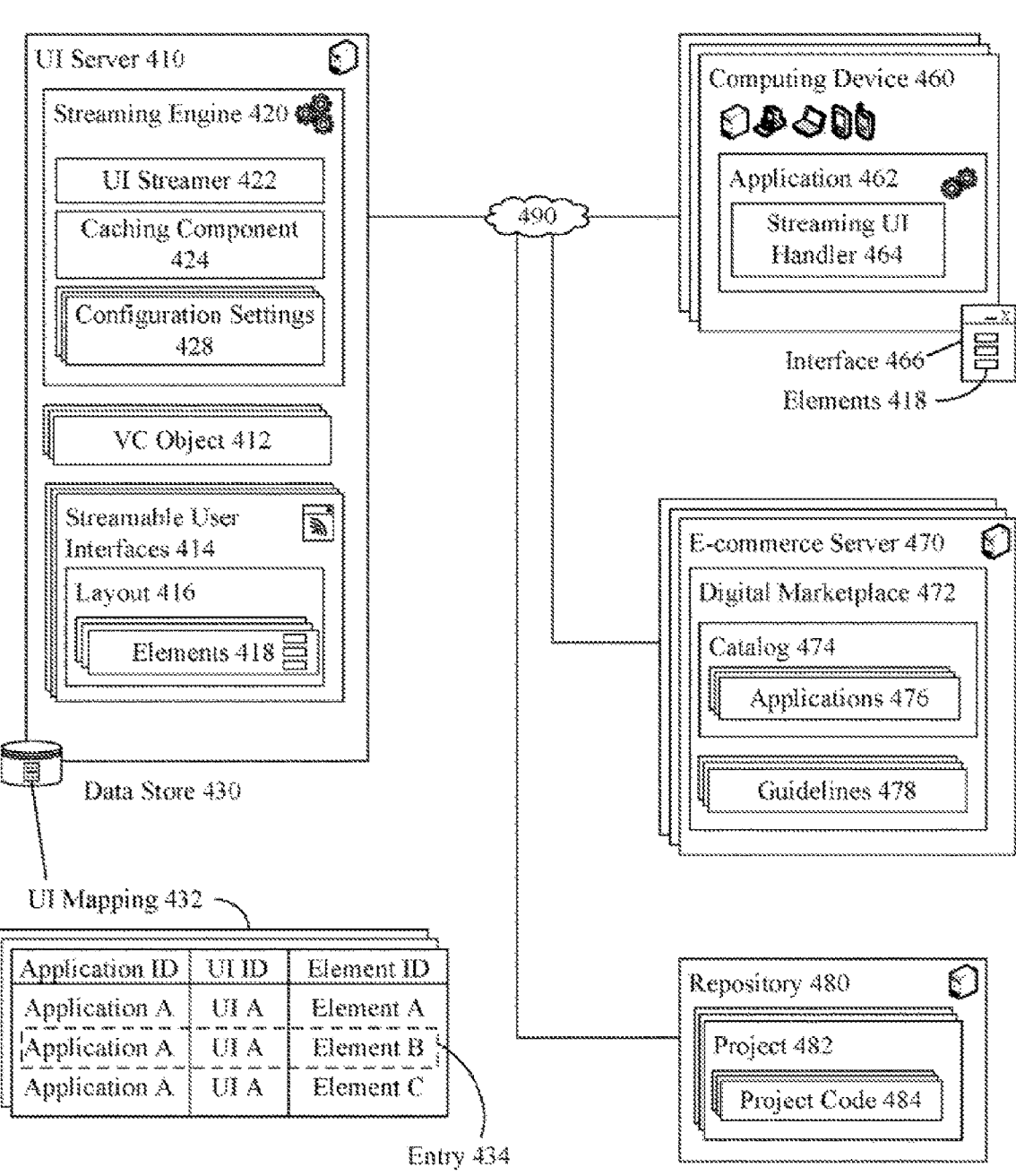
FIG. 4 is a schematic diagram illustrating a system for utilizing cross platform streamable user interfaces to reduce software deployment frequency caused by user interface improvements in accordance with an embodiment of the inventive arrangements disclosed herein.

FIG. 4 is a schematic diagram illustrating a system 400 for utilizing cross platform streamable user interfaces to reduce software deployment frequency caused by user interface improvements in accordance with an embodiment of the inventive arrangements disclosed herein. In system 400, server 410, 470, device 460, repository 480 and/or system 400 components can be communicatively linked via one or more wired and/or wireless networks 490.

In one instance, system 400 can include one or more components of a cloud based computing system. In the instance, system 400 can include AMAZON WEB SERVICES (AWS) functionalities, MICROSOFT AZURE capabilities, IBM CLOUD COMPUTING, and the like. For example, one or more functionalities of engine 420 can be present within a LAMBDA serverless computing service. That is, the disclosure can leverage microservices to enable the functionality described herein.

UI server 410 can be a hardware/software entity for executing streaming engine 420 to enable streamable user interfaces. Server 410 can include, but is not limited to, streaming engine 420, VC object 412, streamable user interfaces 414, data store, and the like. Server 410 functionality can include, but is not limited to, authentication, verification, synchronization, and the like. In one instance, server 410 can include a user interface, messaging/notification capabilities, and the like.

Streaming engine 420 can be a hardware/software element for enabling dynamic UI improvements within application 462. Engine 420 can include, but is not limited to UI streamer 422, caching component 424, configuration setting 428, and the like. Engine 420 functionality can include, but is not limited to, application 462 registration, handler 464 code generation, marketplace deployment capabilities, repository integration, and the like. In one instance, engine 420 can permit integration with integrated development environment (IDE) allowing an IDE to request VC object 412 generation for a specified project of the IDE.

UI streamer 422 can be a hardware/software entity for managing streamable user interfaces 414. Streamer 422 functionality can include, but is not limited to, request handling, VC object 412 conversion, error correction, and the like. In one instance, streamer 422 can generate interfaces 414 from object 412 based on device 460 runtime environment. In one embodiment, streamer 422 can be encapsulated within a Web-based service which can perform real-time or near real-time UI modification.

Caching component 424 can be a hardware/software element for providing real-time or near real-time UI 414 access. Component 424 functionality can include, but is not limited to, cache coherence, prefetching, and the like. In one instance, component 424 can include a Web cache. In one embodiment, component 424 can include an AMAZON ELASTICACHE Web service able to persist interface 414 and/or object 412. It should be appreciated that component 424 can utilize traditional and/or proprietary caching mechanisms to provide UI 414 access during application 462 runtime. In one instance, component 424 can synchronize a local cache associated with application 462 to provide a local copy of UI 414.

Configuration settings 428 can be one or more rules for establishing the behavior of system 400 and/or system 400 components. In one embodiment, settings 428 can include, but is not limited to, VC object 412 creation rules, streamer 422 settings, caching parameters, and the like. In one instance, settings 428 can be manually and/or automatically determined. In the instance, settings 428 can be heuristically determined from historic settings. In one embodiment, settings 428 can be presented within an interface of server 410, interface 466, and the like.

VC object 412 can include project 482 data, project code 484 data, project 484 metadata, repository 480 data, and the like. In one instance, object 412 can include, but is not limited to, unique identifiers of control elements, layout data, and the like. In one embodiment, VC object 412 can be modified through the use of a software development tool (e.g., UI builder 121). In one instance, object 412 can be persisted within data store 430, repository 480, and the like.

In one instance, one or more portions of streamable user interface 414 can be conveyed to application 462 during runtime. In the instance, layout 416 and/or elements 418 can be transmitted piecemeal to enable selective UI updates.

Data store 430 can be a hardware/software component able to persist configuration settings 428, VC object 412, streamable user interfaces 414, mapping 432, and the like. Data store 430 can be a Storage Area Network (SAN), Network Attached Storage (NAS), and the like. Data store 430 can conform to a relational database management system (RDBMS), object oriented database management system (OODBMS), non-relational database management systems, and the like. Data store 430 can be communicatively linked to server 410 in one or more traditional and/or proprietary mechanisms. In one instance, data store 430 can be a component of Structured Query Language (SQL) complaint database.

UI mapping 432 can be a data set for enabling granular control over UI synchronization during runtime. Mapping 432 can include, but is not limited to, application identifier, user interface identifiers, control element identifiers, and the like. In one instance, entry 434 can permit an element B of a user interface A within an application A to be identified allowing streamer 422 to convey the element B when an improvement to B occurs. In one embodiment, mapping 432 can be generated manually and/or automatically. It should be appreciated that mapping 432 is an exemplary data set for enabling the functionality described herein and should not be construed to limit the invention in any regard.

Computing device 460 can be a hardware/software element for permitting the execution of application 462. Device 460 can include, but is not limited to, interface 466, device 460 settings, and the like. Computing device 460 can include, but is not limited to, a desktop computer, a laptop computer, a tablet computing device, a personal digital assistant (PDA), a mobile phone, a set-top box, and the like. In one instance, device 460 can include, but is not limited to, a gaming console, an entertainment device (e.g., smart TV), and the like. In one instance, device 460 can execute application 462 which can present one or more control elements 418. In one embodiment, application 462 can include streaming UI handler 464, application data, and the like. In the embodiment, handler 464 can function as a client side component to enable synchronicity between interface 414 versioning. For example, handler 464 can be utilized to maintain a local cache of interface 414 which can be compared against a remote cache during application startup.

E-commerce server 470 can be a hardware/software entity for presenting digital marketplace 472. Server 470 functionality can include, but is not limited to, application distribution, application 476 submission, application 476 approval, and the like. Server 470 can include, but is not limited to, digital marketplace 472, guidelines 478, and the like. In one instance, digital marketplace 472 can include catalog 474, catalog data, and the like. In the instance, catalog 474 can include application 476, application description, application data, and the like. In one instance, guidelines 478 can include, but is not limited to UI guidelines, layout guidelines, animation guidelines, usability guidelines, and the like.

Repository 480 can be a hardware/software entity for can be an on-disk data structure which can store metadata for a set of files and/or directory structure. Repository 480 can persist project 482, repository 480 settings, and the like. In one instance, project 482 can include, but is not limited to, project code 484, support files, and the like. Project code 484 can include, but is not limited to, compiled language source files, interpreted source code files, markup files, and the like. For example, code 484 can be an Objective C, Swift, or, C #language source code file. Support files can include, but is not limited to, build files (e.g., Gradle scripts), metadata files (e.g., manifest.xml, Storyboard), resource files (e.g., strings, bitmap images), and the like.

Network 490 can be an electrical and/or computer network connecting one or more system 400 components. Network 490 can include, but is not limited to, twisted pair cabling, optical fiber, coaxial cable, and the like. Network 490 can include any combination of wired and/or wireless components. Network 490 topologies can include, but is not limited to, bus, star, mesh, and the like. Network 490 types can include, but is not limited to, Local Area Network (LAN), Wide Area Network (WAN), Virtual Private Network (VPN) and the like.

Drawings presented herein are for illustrative purposes only and should not be construed to limit the invention in any regard. It should be appreciated that one or more components within system 400 can be optional components permitting that the disclosure functionality be retained. It should be understood that engine 420 components can be optional components providing that functionality is maintained. It should be appreciated that one or more components of engine 420 can be combined and/or separated based on functionality, usage, and the like. System 400 can conform to a Service Oriented Architecture (SOA), Representational State Transfer (REST) architecture, and the like.

Cloud computing can be a technology which can provide on-demand cloud computing platforms on a paid subscription basis. Cloud computing can include virtual cluster of computers, continually available, through the Internet. Cloud computing can include, but is not limited to, virtual machines, virtual private clouds (e.g., protected networks), virtual public clouds, virtual routers, virtual computing hardware, and the like. Virtual machines can include central processing units (CPU), graphical processing unit (GPU) for processing, Random Access Memory, console I/O (keyboard, display, mouse), storage, an operating system, application software (e.g., Web servers, databases, CRM, etc.), and the like.

It should be appreciated that cloud computing can include AMAZON WEB SERVICES (AWS) and/or AWS related services/functionality. As used herein, AWS Lambda can be an event-driven, serverless computing platform provided by AMAZON as a part of the AMAZON WEB SERVICES. LAMBDA can be a compute service that runs code in response to events and automatically manages the compute resources required by that code.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating UI designs using deep learning, comprising the steps of:

training a learning model on a dataset of existing UI designs;

receiving user parameters and constraints for generating a quick UI design;

generating a UI design using the trained deep learning model and user-provided parameters and constraints;

providing an editor for the user to edit the quick UI design into a finished UI design;

generating human-readable front-end code from the finished UI design;

sending information in the form of code to a receiving computing device having a GUI;

identifying selection data from the received information, in a template for software code, from describing GUIs in various code environments, in a tree data structure format;

recursively comparing the selection data describing the GUI and selecting an appropriate template which most closely matches the selection data;

altering the selected template to include the received input information describing the desired GUI;

compiling API native source code files in a code environment native to the receiving computing device;

executing the compiled source code files by a processor; and recreating the same image sent in the receiving computing device as the one sent by a sending device, represented by different codes on each of said device.

2. The method of claim 1, further comprising the step of integrating the generated front-end code into an existing development workflow.

3. The method of claim 1, wherein the user-provided parameters and constraints include the number of buttons, color scheme, and overall layout of the UI.

4. The method of claim 1, further comprising generating native code source files for separate receiving computing device screen sizes, wherein native code source file code properties are changed for the screen size.

5. The method of claim 1, wherein the selected template includes instructions related to a feature of a GUI, the feature of the GUI including any user interface (UI) element or operation or event selected from the group consisting of buttons, text areas, animations, photographs, movies, text entry fields, and interfaces having backend application code.

6. The method of claim 1, further comprising generating native code in the altered template before it is compiled into the compiled native code source files, wherein the native code is adapted to properly display for separate receiving computing device screen sizes, wherein the native code source files include a window listener that detects screen size usage and then uses the appropriate native code source file for the detected screen size usage.

7. The method of claim 1, wherein native code is included in a source file, wherein the native code is adapted to properly display for separate receiving computing device screen sizes, wherein the native code source files include a window listener that detects screen size usage and then uses the appropriate native code source file for the screen size.

8. The method of claim 1, comprising receiving from input information regarding a desired GUI and recursively selecting a native code template that describe GUI features similar to the feature from the input information regarding the desired GUI, and then assembles the code based upon a source tree structure.

9. The method of claim 1, wherein a native code template related to a feature of a GUI is related to any UI element or operation or event, including buttons, text areas, animations, photographs, movies, text entry fields, or interfaces with backend application code, and orders them, by user direction, based upon how a user creates a visual image on a sending device.

10. A system for generating UI designs using deep learning, comprising:

a learning model trained on a dataset of existing UI designs;

a user interface for receiving user parameters and constraints for generating a quick UI design;

a generator module for generating a UI design using the trained deep learning model and user-provided parameters and constraints;

an editor for the user to edit the quick UI design into a finished UI design;

a code generator module for generating human-readable front-end code from the finished UI design;

code for:

sending information in the form of code to a receiving computing device having a GUI;

identifying selection data from the received information, in a template for software code, from describing GUIs in various code environments, in a tree data structure format;

recursively comparing the selection data describing the GUI and selecting an appropriate template which most closely matches the selection data;

altering the selected template to include the received input information describing the desired GUI;

compiling API native source code files in a code environment native to the receiving computing device;

executing the compiled source code files by a processor; and recreating the same image sent in the receiving computing device as the one sent by a sending device, represented by different codes on each of said devices.

11. The system of claim 10, further comprising an integration module for integrating the generated front-end code into an existing development workflow.

12. The system of claim 10, wherein the user interface allows the user to provide parameters and constraints such as the number of buttons, color scheme, and overall layout of the UI.

13. The method of claim 10, further comprising generating native code source files for separate receiving computing device screen sizes, wherein a media query is used to change properties for native code source file for the screen size.

14. The system of claim 10, wherein the selected template includes instructions related to a feature of a GUI, the feature of the GUI including any user interface (UI) element or operation or event selected from the group consisting of buttons, text areas, animations, photographs, movies, text entry fields, and interfaces having backend application code.

15. The system of claim 10, further comprising code to generate native code in the altered template before it is compiled into the compiled native code source files, wherein the native code is adapted to properly display for separate receiving computing device screen sizes, and wherein a media query is used to change properties for native code source file for the screen size.

16. The system of claim 10, wherein native code is included in a source file, wherein the native code is adapted to properly display for separate receiving computing device screen sizes, wherein the native code source files include a window listener that detects screen size usage and then uses the appropriate native code source file for the screen size.

17. The system of claim 10, comprising code to receive from input information regarding a desired GUI and recursively select a native code template that describe GUI features similar to the feature from the input information regarding the desired GUI, and then assembles the code based upon a source tree structure.

18. The system of claim 10, wherein a native code template related to a feature of a GUI is related to any UI element or operation or event, including buttons, text areas, animations, photographs, movies, text entry fields, or interfaces with backend application code, and orders them, by user direction, based upon how a user creates a visual image on a sending device.

* * * * *